(12) United States Patent
Kernwein et al.

(10) Patent No.: US 6,208,246 B1
(45) Date of Patent: Mar. 27, 2001

(54) METHOD AND APPARATUS FOR IMPROVING RAILCAR VISIBILITY AT GRADE CROSSINGS

(75) Inventors: Jeffrey D. Kernwein; David H. Halvorson, both of Cedar Rapids, IA (US)

(73) Assignee: Wabtec Railway Electronics, Inc., Germantown, MD (US)

(*) Notice: Subject to any disclaimer, the term of this patent is extended or adjusted under 35 U.S.C. 154(b) by 0 days.

(21) Appl. No.: 09/127,410

(22) Filed: Jul. 31, 1998

(51) Int. Cl.[7] .................................................. B60Q 1/26
(52) U.S. Cl. ...................... 340/468; 340/466; 340/468; 340/463; 246/115; 246/117; 246/167
(58) Field of Search ..................... 340/464, 466, 340/467, 468, 463; 362/6; 246/115, 117, 113, 167

(56) References Cited

U.S. PATENT DOCUMENTS

| | | | |
|---|---|---|---|
| 1,738,016 | * 12/1929 | Pehrson | 246/124 |
| 5,361,070 | 11/1994 | McEwan | 342/21 |
| 5,457,394 | 10/1995 | McEwan | 324/642 |
| 5,510,800 | 4/1996 | McEwan | 342/387 |
| 5,512,834 | 4/1996 | McEwan | 324/642 |
| 5,518,561 | * 5/1996 | Rosa . | |
| 5,534,733 | * 7/1996 | Wetzel et al. | 307/9.1 |
| 5,603,556 | 2/1997 | Klink | 303/22.6 |
| 5,630,216 | 5/1997 | McEwan | 455/215 |
| 5,821,700 | * 10/1998 | Malvaso | 315/291 |

* cited by examiner

Primary Examiner—Daryl Pope
(74) Attorney, Agent, or Firm—McGuireWoods LLP

(57) ABSTRACT

A method and apparatus for providing warning lamps on the side of railcars where the lamps are powered by and receive information from a power line extending across numerous cars of the train and where the power line also provides power and information to the electronic air brakes disposed on the various railcars.

32 Claims, 2 Drawing Sheets

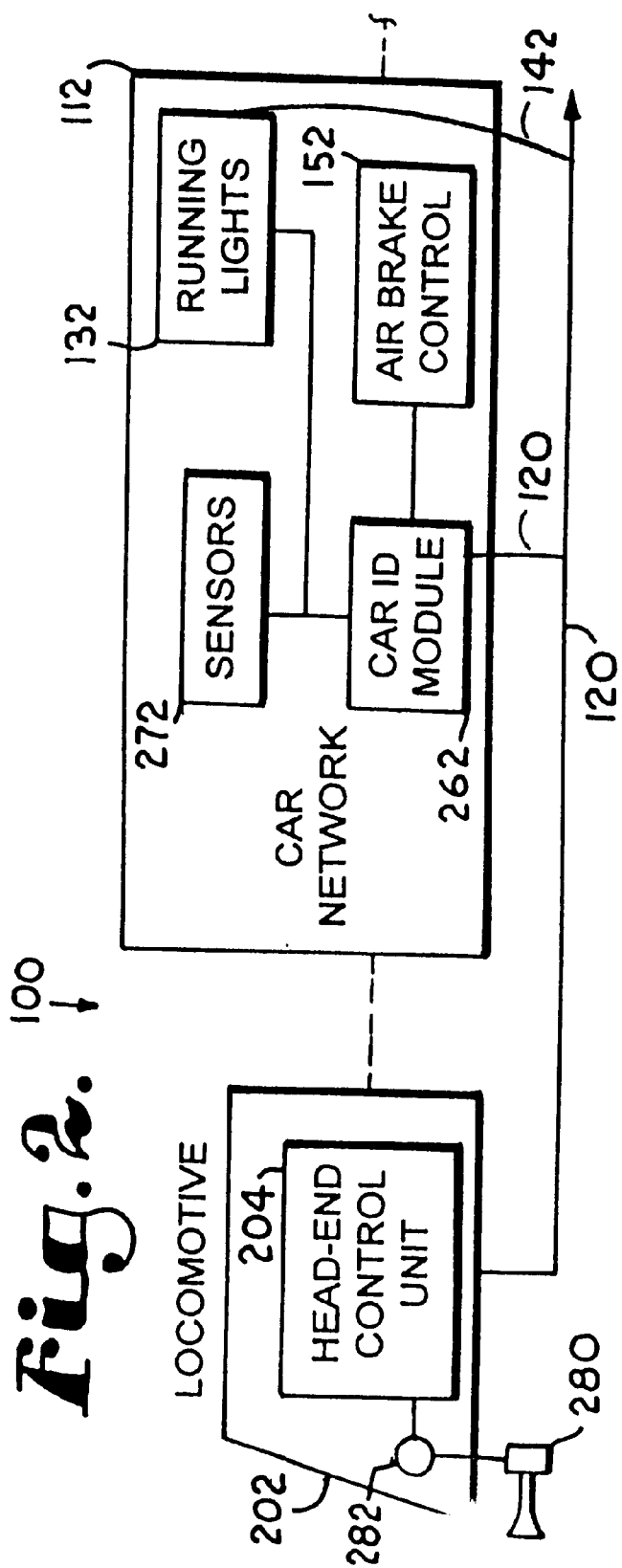

METHOD AND APPARATUS FOR IMPROVING RAILCAR VISIBILITY AT GRADE CROSSINGS

BACKGROUND OF THE INVENTION

The present invention generally relates to railroad grade crossing safety systems and more particularly relates to on-board railroad grade crossing safety systems.

In the past, numerous steps have been taken to help reduce accidents between trains and automobiles at railroad grade crossings. One step commonly used is to provide railroad grade crossing barriers or barricades which extend across the roadway as a train approaches and crosses the grade crossing. This would be considered a protected grade crossing. These barricades are usually associated with flashing red lights to catch the attention of approaching motorists. While these barricades are very helpful at reducing automobile to train collisions, they are expensive, and it is often viewed as cost prohibitive to place these barricades at every railroad grade crossing. One method that has been used in the past to help reduce automobile/train collisions is to require the locomotive engineer to sound a loud horn as the train approaches every grade crossing. While this approach of sounding a horn at a grade crossing has been helpful, the primary benefit is for trains which are approaching a grade crossing, and it does very little to help with collisions between automobiles and a rear section of the train. Every year numerous automobiles drive into the side of a train occupying a grade crossing, especially during times of low visibility, such as snow, fog, or a late-night rainstorm, etc.

Consequently, there exists a need for improved railroad grade crossing systems which help reduce collisions occurring between automobiles and rear sections of a train as it passes an unprotected railroad grade crossing.

SUMMARY OF THE INVENTION

It is an object of the present invention to provide enhanced railroad grade crossing safety.

It is a feature of the present invention to include running lights disposed on railcars.

It is an advantage of the present invention to warn automobiles of the existence of all sections of a train as it crosses a railroad grade crossing.

It is another object of the present invention to enhance railroad safety in an economically efficient manner.

It is another feature of the present invention to utilize a power line extending between the railcars which is used for operating electronic air brake systems.

It is another advantage of the present invention to minimize the financial investment necessary to deploy such a system.

The present invention is a method and apparatus for improving railcar visibility at grade crossings which is designed to satisfy the aforementioned needs, achieve the above-mentioned objects, include the herein-described features and achieve the already articulated advantages.

Accordingly, the present invention includes a plurality of railcars with an electronic communication/power line extending therebetween for use by an electronic air brake system and at least one running light disposed on the railcar where the running light is powered by the communication/power line for the electronic air brake system.

BRIEF DESCRIPTION OF THE DRAWINGS

The invention may be more fully understood by reading the following description of the preferred embodiments of the invention in conjunction with the appended drawings wherein:

FIG. 2 is a block diagram of components of the present invention in its intended environment in which the components of the invention found on a single car are detailed while a series of dots represents a series of similarly constructed railcars.

DETAILED DESCRIPTION OF THE PREFERRED EMBODIMENT

Figure 1:
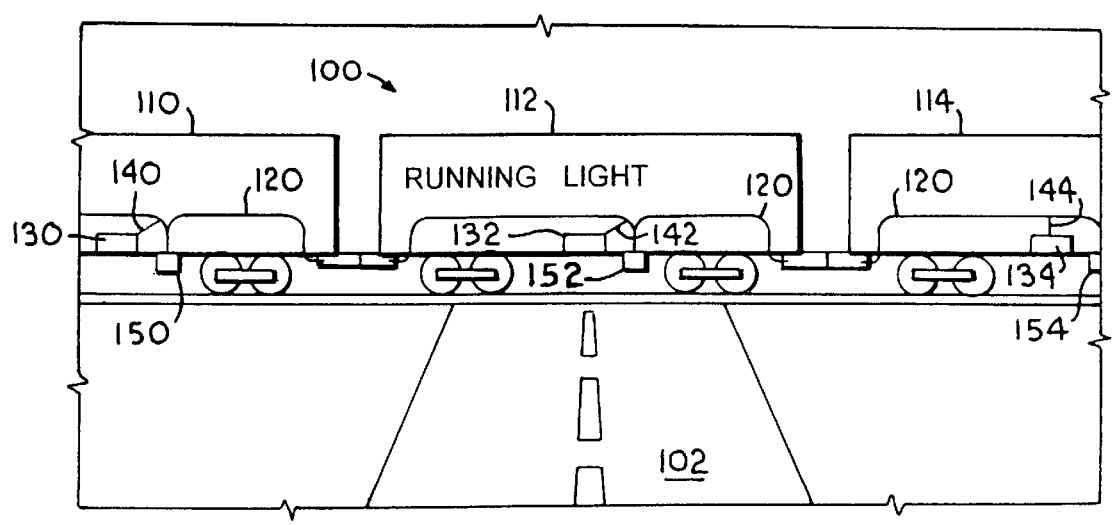
FIG. 1 is a side view of a train, of the present invention, as it crosses a highway at an unprotected grade crossing.

Now referring to the drawings, wherein like numerals refer to like matter throughout, and more particularly to FIG. 1, there is shown a side view of a train of the present invention generally designated 100, as it crosses a highway 102. Train 100 is shown including cars 110, 112 and 114. Interconnecting the cars 110, 112 and 114 of train 100 is an electronic air brake power line designated 120, which is used to provide power for the electronic air brake system, as well as a medium for communicating messages from a locomotive (not shown) to the various railcars of the train 100, including cars 110, 112 and 114. The cars 110, 112 and 114 are shown having running lights 130, 132 and 134 respectively disposed thereon. Connecting running lights 130, 132 and 134 to power line 120 are lines 140, 142 and 144 respectively. Also shown on cars 110, 112 and 114 are electronic air brake systems 150, 152 and 154 respectively. Power line 120 runs the length of the train 100 and connects the various air brake systems, including electronic air brake systems 150, 152 and 154. It should be understood that a similar running light may be disposed on the opposite side of the railcar to alert motorists approaching from the opposite direction. It should also be understood that the system of the present invention could be employed with a power line that does not relate to an electronic air brake system.

Now referring to FIG. 2, there is shown a train 100 of the present invention, having a locomotive 202 and a head end control unit 204 disposed thereon. Running the length of train 100 is power line 120. Train 100 could include numerous railcars; however, FIG. 2 shows a representative railcar 112 having an air brake control 152 thereon, as well as running lights 132. Running lights 132 may be any type of device which utilize power on the power line 120 to generate or regulate emission of light in a direction toward motorists approaching a train at a railroad grade crossing, including but not limited to incandescent, fluorescent, iridescent, luminescent, phosphorescent, gas discharge, electroluminescent, among others. Light-emitting diodes (LEDs) with their ruggedness and low power consumption may be well suited as running lights 132. Each railcar may also include a car ID module 262, which includes a unique identification for each railcar and may further include an intra-car network which couples the various electronic components on the car. The car ID module 262 may also be responsible for running light power regulation from power line 120 and illumination control as it receives running light messages from the powerline. Such components may be additional sensors 272 which are optional and are not necessary for operation of the present invention.

In operation, the present invention may be operated in conjunction with the horn 280 located on the locomotive 202 and connected with a horn switch 282. For example, as a train approaches a grade crossing, the locomotive engineer may sound a horn by pushing a button 282 or pulling a lever. This action could also be used to activate the running lights 132. The lights may all be turned on simultaneously or, in the alternative, only those sections approaching and crossing a road may be illuminated. It is expected that various schemes may be employed to provide the necessary illumination and to concomitantly limit the power consumption and the duration of illumination of lights 132, such as using the speed of the train, the known length of the train, distance traveled (e.g. odometer readings) and a timer to activate and deactivate the running lights at appropriate times.

It is thought that the method and apparatus of the present invention will be understood from the foregoing description and that it will be apparent that various changes may be made in the form, construction, steps and arrangement of the parts and steps thereof, without departing from the spirit and scope of the invention or sacrificing all of their material advantages. The form herein described being a preferred or exemplary embodiment thereof.

We claim:

1. A railroad grade crossing safety system of the type used on a train having a pneumatic brake line running the length of the train and an electronic power line running the length of the train which is used for providing power and communication signals to electronically controlled pneumatic air brakes on a plurality of railcars on the train, the grade crossing safety system comprising:
    means for generating light on a side of said plurality of railcars in a direction toward motorists approaching a railroad grade crossing;
    means for selectively activating from a single control point each of said means for generating light on said plurality of railcars to emit light in a direction toward a motorist approaching the grade crossing; and
    means for coupling said means for generating light to said electronic power line.

2. The railroad grade crossing system of claim 1 wherein said means for generating light is a plurality of light-emitting diodes.

3. The railroad grade crossing safety system of claim 2 wherein said means for coupling is an extension of said electronic power line.

4. The railroad grade crossing safety system of claim 2 wherein said means for selectively activating said means for generating light is utilized for enabling and disabling the illumination of the light emitting diodes.

5. The railroad grade crossing safety system of claim 4 wherein said means for selectively activating utilizes a speed characteristic of said train, a distance traveled characteristic and a timer to selectively illuminate the light-emitting diodes as the light emitting diodes approach and cross a grade crossing and then upon traversing the grade crossing, using said speed characteristic and said timer to discontinue illumination of said light-emitting diodes.

6. The railroad grade crossing safety system of claim 5 wherein said means for selectively activating further provides for flashing of said light-emitting diodes to better alert approaching motorists of the presence of the train.

7. The railroad grade crossing safety system of claim 6 wherein said means for selectively activating is a programmed head end unit disposed in a locomotive.

8. The railroad grade crossing safety system of claim 1 wherein said means for generating light is an incandescent lamp.

9. The railroad grade crossing system of claim 1, further comprising a plurality of air brake systems, wherein said electronic power line is connected to each of said plurality of air brake systems.

10. The railroad grade crossing system of claim 1, further comprising for each railcar a railcar ID module, wherein said electronic power line is connected to each of said railcar ID modules.

11. A method of alerting motorists of the presence of a train at a grade crossing comprising the steps of:
    providing a power line extending between a plurality of railcars in a train where each of said plurality of railcars is coupled to said power line and said power line is utilized to provide power and operational signaling to electronic air brake systems located on each of said plurality of railcars;
    providing a lamp on each of said plurality of railcars for generating light; and
    selectively activating at least two of the lamps from a single control point to emit light in a direction toward a motorist approaching the grade crossing.

12. The method of claim 11 wherein a lamp control signal selectively activates an operational characteristic of said lamp.

13. The method of claim 12 wherein the lamp control signal includes a signal for disabling illumination of said lamp after each of said plurality of railcars traverses the railroad grade crossing.

14. The method of claim 12 wherein the lamp control signal includes providing a signal to said lamp resulting in flashing of the lamp to further improve the ability for an approaching motorist to perceive the presence of a passing railcar.

15. The method of claim 12 wherein the lamp control signal includes providing a signal to continuously illuminate said lamp during operation of said train.

16. The method of claim 12 wherein the lamp control signal includes generation of a signal in response to a sounding of a horn as said train approaches a grade crossing.

17. A system for alerting motorists of the presence of a train at a railroad grade crossing comprising:
    an inter-car power line extending between a plurality of train railcars wherein each railcar is electrically coupled to said power line;
    an electronic air brake system disposed on at least one of the railcars wherein said electronic air brake system is electrically coupled to said power line and receives both power and information on said power line;
    at least two lamps coupled to said power line, one of said at least two lamps being mounted on a side of said plurality of train railcars, said at least two lamps generating light directed toward motorists approaching said grade crossing; and
    a controller for controlling from a single control point an illumination characteristic of each of said at least two lamps based upon a position of said lamps with respect to the grade crossing.

18. The system of claim 17 wherein said controller deactivates each of said at least two lamps after each said lamp has traversed said grade crossing.

19. The system of claim 18 wherein each of said at least two lamps is an incandescent lamp.

20. The system of claim 18 wherein each of said at least two lamps comprises a plurality of light-emitting diodes.

21. The system of claim 20 wherein said light-emitting diodes are manipulated to create a flashing illumination characteristic.

22. A railroad grade crossing safety system of the type used on a train having a pneumatic brake line running the length of the train and an electronic power line running the length of the train which is used for providing power and communication signals to electronically controlled pneumatic air brakes on a plurality of railcars on the train, the grade crossing safety system comprising:

a plurality of light-emitting diodes on said plurality of railcars positioned to emit light in a direction toward motorists approaching a railroad grade crossing;

means for selectively activating each of said plurality of light emitting diodes, wherein said means for selectively activating enables and disables the illumination of the light emitting diodes, and wherein said means for selectively activating utilizes a speed characteristic of said train, a distance traveled characteristic and a timer to selectively illuminate said light-emitting diodes as said light emitting diodes approach and cross a grade crossing and then upon traversing the grade crossing, using said speed characteristic and said timer to discontinue illumination of said light-emitting diodes; and an extension of said electronic power line for coupling said light-emitting diodes to said electronic power line.

23. The railroad grade crossing safety system of claim 22 wherein said means for selectively activating further provides for flashing of said light-emitting diodes to better alert approaching motorists of the presence of the train.

24. The railroad grade crossing safety system of claim 23 wherein said means for selectively activating is a programmed head end unit disposed in a locomotive.

25. A method of alerting motorists of the presence of a train at a grade crossing comprising the steps of:

providing a power line extending between a plurality of railcars in a train where each of said plurality of railcars is coupled to said power line and said power line is utilized to provide power and operational signaling to electronic air brake systems located on each of said plurality of railcars;

providing a lamp on a side of each of said plurality of railcars for generating light directed toward motorists approaching said grade crossing; and selectively activating one or more of the lamps to emit light in a direction toward a motorist approaching the grade crossing, wherein a lamp control signal selectively activates said lamp and disables the illumination of said lamp after each of said plurality of railcars traverses the railroad grade crossing.

26. The method of claim 25 wherein the lamp control signal includes providing a signal to said lamp resulting in flashing of the lamp to further improve the ability for an approaching motorist to perceive the presence of a passing railcar.

27. The method of claim 25 wherein the lamp control signal includes generation of a signal in response to a sounding of a horn as said train approaches a grade crossing.

28. A method of alerting motorists of the presence of a train at a grade crossing comprising the steps of:

providing a power line extending between a plurality of railcars in a train where each of said plurality of railcars is coupled to said power line and said power line is utilized to provide power and operational signaling to electronic air brake systems located on each of said plurality of railcars;

providing a lamp on a side of each of said plurality of railcars for generating light directed toward motorists approaching said grade crossing; and selectively activating one or more of the lamps to emit light in a direction toward a motorist approaching the grade crossing, wherein a lamp control signal continuously illuminates said one or more of the lamps during operation of said train.

29. A system for alerting motorists of the presence of a train at a railroad grade crossing comprising:

an inter-car power line extending between a plurality of train railcars wherein each railcar is electrically coupled to said power line;

an electronic air brake system disposed on at least one of the railcars wherein said electronic air brake system is electrically coupled to said power line and receives both power and information on said power line;

a lamp coupled to said power line and mounted on a side of each of said plurality of railcars, said lamp for generating light directed toward motorists approaching said grade crossing; and a controller for controlling an illumination characteristic of said lamp based upon a position of said lamp relative to the grade crossing, wherein said controller deactivates said lamp after said lamp has traversed said grade crossing.

30. The system of claim 29 wherein said lamp is an incandescent lamp.

31. The system of claim 29 wherein said lamp comprises a plurality of light-emitting diodes.

32. The system of claim 31 wherein said light-emitting diodes are manipulated to create a flashing illumination characteristic.

* * * * *